March 8, 1960  F. TYLER ET AL  2,927,790
PHOTOGRAPHIC FILM-ADVANCING MECHANISMS
Filed Feb. 27, 1957  2 Sheets-Sheet 1

INVENTORS
Frank Tyler & Peter Dowding
By
Moore and Hall
ATTORNEYS

March 8, 1960   F. TYLER ET AL   2,927,790
PHOTOGRAPHIC FILM-ADVANCING MECHANISMS
Filed Feb. 27, 1957   2 Sheets-Sheet 2
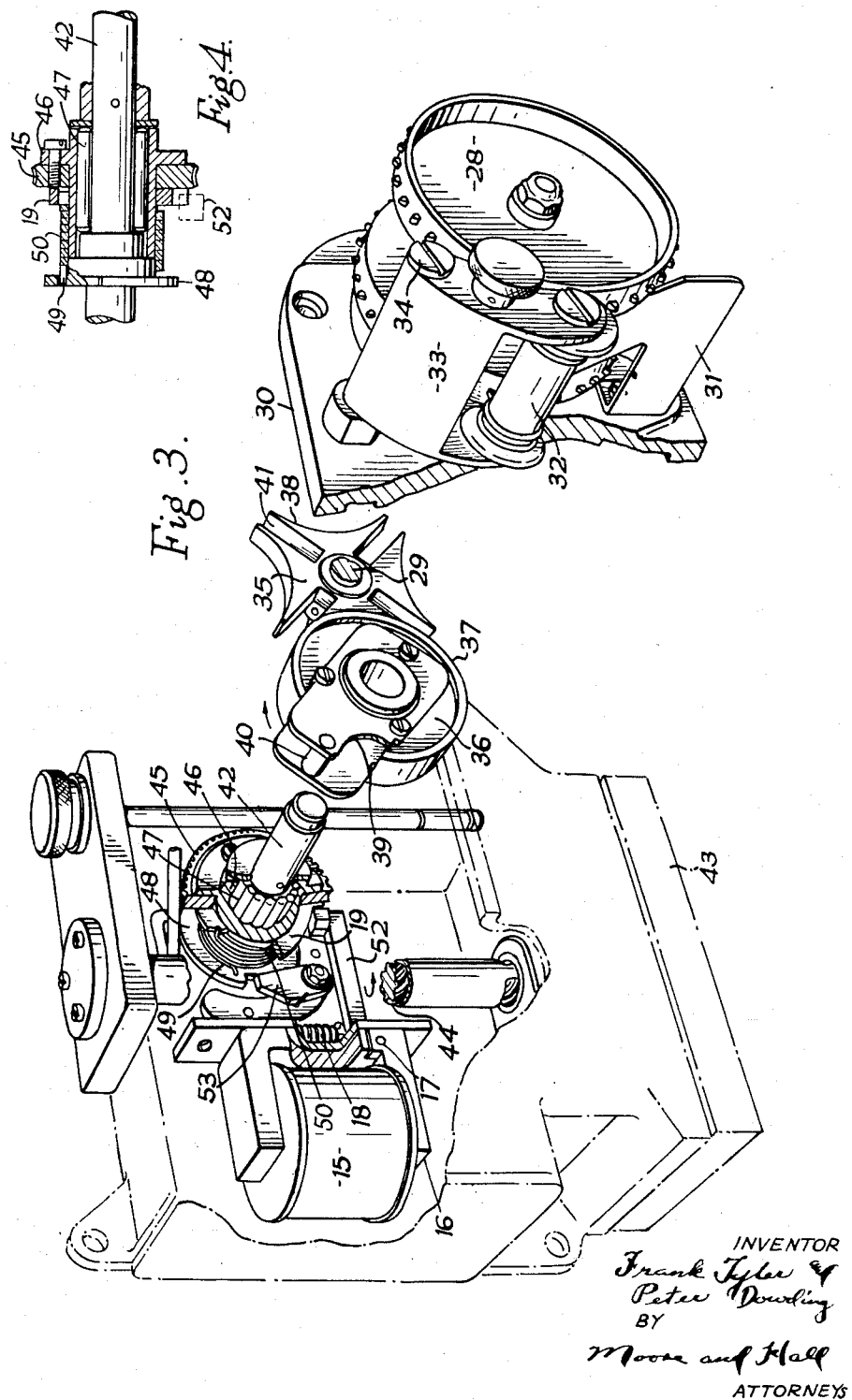
INVENTOR
Frank Tyler
Peter Dowding
BY
Moore and Hall
ATTORNEYS

United States Patent Office 2,927,790
Patented Mar. 8, 1960

2,927,790

PHOTOGRAPHIC FILM-ADVANCING MECHANISMS

Frank Tyler, Barkingside, and Peter Dowding, Chigwell, England, assignors to Kelvin & Hughes Limited, Glasgow, Scotland, a British company Application February 27, 1957, Serial No. 642,697

Claims priority, application Great Britain March 2, 1956

4 Claims. (Cl. 271—2.4)

The present invention relates to photographic film-advancing mechanism and has particular, but not exclusive, reference to apparatus by which pictures are photographed, processed and projected within a short time interval.

Such apparatus, for example, is frequently used in the photographing processing and projection of images appearing on the screen of a cathode ray tube. The trace on the cathode ray tube is photographed on a photographic light sensitive film which remains stationary in a camera at an exposure station for a predetermined time interval. It is then passed from the camera to a processing station where again it remains for the same time whilst a new picture is taken at the exposure station. From the processing station, the film passes on to a projection station where an image thereof is projected upon a screen. In apparatus of this kind the operation at the processing station is so timed that processing will be completed by the time the photographic film is moved on to the projection station.

It is the principal object of the present invention to provide an improved film-advancing mechanism by means of which a film can be maintained in a station for a predetermined time and then advanced a predetermined distance.

According to the present invention, film-advancing means comprise a sprocket adapted to engage in perforations in the film, a mechanism, such as a Maltese cross Geneva mechanism, coupled to the sprocket and determining the extent of the angular movement of the sprocket for each rotation of a driving member, a friction clutch which, when actuated, couples the driving member to the shaft of a continuously-rotating motor, and means for intermittently actuating the clutch.

The clutch-actuating means are preferably electromagnetic and may comprise switch means operated by a rotating cam and adapted during part of each revolution of the cam to apply a charge to a capacitor and at a predetermined point in the revolution of the cam to cause discharge of the capacitor through the electromagnetic means thereby actuating the clutch.

Figure 1:
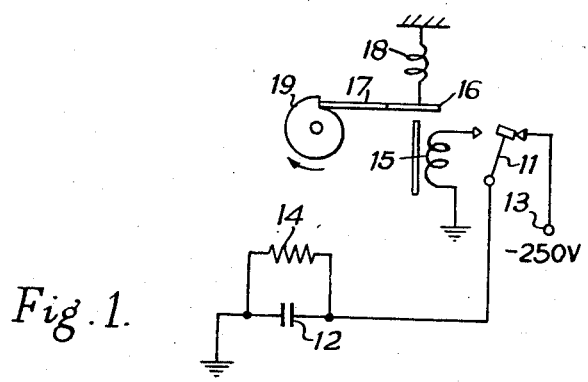
Figure 2:
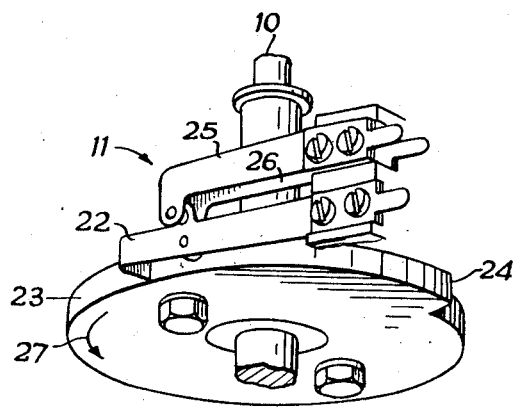

The invention will be described, by way of example, with reference to the accompanying drawing in which:

Fig. 1 is a diagram illustrating the operation of an embodiment of the invention, Fig. 2 shows in perspective a part of a cam-operated switch for use in the invention, Fig. 3 is a perspective exploded view of parts of a film-advancing mechanism that can be used with the switch of Fig. 2 in carrying out the invention, and Fig. 4 shows a view in sectional elevation of a part of Fig. 3.

Corresponding parts in different figures have the same references.

The particular apparatus of which that shown in Figs. 2 and 3 is a part is for the photographing, processing and projection of radar images appearing on a cathode ray tube, in which all the operations are carried out in synchronism with the radar aerial scan. A cam switch assembly has its shaft 10 in Fig. 2 driven by a servo motor (not shown) in synchronism with the radar aerial and the time taken for one rotation of the radar aerial corresponds to the time taken for one revolution of the shaft. The shaft 10 carries a number of cams each cooperating with a switch. Some of the switches are arranged to operate a processing cycle as described in the specification of British application S.N. 6720/56 and one of the switches shown in Fig. 2 is arranged to operate film-advancing mechanism. It will be seen that by a suitable arrangement of the cams, the operations may be timed to take place at predetermined intervals.

The radar signals are presented upon the screen of a cathode ray tube, light from which is arranged to pass through a camera lens on to a film held flat in a gate by a suitable clamping device and passes from the gate through a processing station and a projecting station. The film remains stationary in the gate for the time controlled by the film-advance cam switch.

Referring now to Fig. 1, the switch shown in Fig. 2, and to be described in more detail later, is shown at 11 in Fig. 1. When this switch is in the position shown in Fig. 1 a capacitor 12 (or a bank of parallel-connected capacitors) is connected between the negative terminal 13 of a current source and earth, the positive terminal of this source being earthed. A large resistance 14 is connected across the capacitor to provide a slow leak. When the switch 11 moves to its opposite position, capacitor 12 discharges through an electromagnet 15, the armature 16 of which is pivoted at 17 and is biased to the position shown by a tension spring 18. The energising of the electromagnet 15 lifts the left hand end of the armature 16 and releases a cam 19 to which torque is applied in the direction of the arrow by a torsion spring to be described in more detail later. The cam 19 then rotates. Before it has completed a revolution, the capacitor 12 has discharged and the armature 16 is released and engages the step in the cam 19. This cam, therefore, executes one complete revolution for each actuation of the switch 11.

When the switch returns to the position shown in Fig. 1, which is arranged to be soon after the discharge of the capacitor 12, the capacitor begins to charge again in preparation for a further cycle of operations.

So long as the armature 16 engages the step in the cam 19, the cam remains at rest. Each revolution of the cam 19 is arranged, as will be described later, to move the film forward by one frame.

Referring to Fig. 2, the switch 11 comprises a blade 22 engaging with a cam 23 having a step 24. The blade 22 in its outermost position makes contact with a fixed blade 25 and this position corresponds with that shown in Fig. 1 in which the capacitor 12 charges. When the cam 23 rotates in the direction of the arrow 27 to cause the step 24 to come beneath the blade 22, this blade moves inwards and makes contact with a second fixed blade 26. This corresponds to the position in which the capacitor 12 of Fig. 1 discharges through the electromagnet 15.

The cam 23 may have a dwell, proceeding from the step 24 in a direction opposite to that of the arrow 27, (that is in the direction of movement of the blade 22 over the cam) of 30° at the smallest radius, followed by a rise for 100°, and then by a dwell of 230° in the larger radius while the capacitor is charged.

Referring now to Fig. 3, a film sprocket 28 is mounted on a shaft 29 supported in a frame 30. The sprocket 28 is provided with the usual film stripper 31 and film roller 32 mounted in a roller frame 33 rockable upon a spindle 34 fixed in the frame 30. Fixed upon the shaft 29 is a Maltese cross 35 of normal design co-operating with a cam 36 having a cylindrical surface 37 adapted to engage snugly in the hollows 38 of the Maltese cross, the cylindrical surface being interrupted at 39. A roller 40 is adapted to engage in each slot 41 of the Maltese cross. Thus one revolution of the cam 36 effects a quarter revolution of the Maltese cross and of the film sprocket 28, thereby advancing the film by one frame. The cam 36 is fixed upon a main shaft 42.

A motor, not shown in Fig. 3, is arranged within the base 43 and drives continuously a worm shaft 44 which drives a worm wheel 45. The worm wheel 45 is bolted to a sleeve 46 which runs free on the main shaft 42 on needle roller bearings 47.

As shown in Figs. 3 and 4, to the rear end of the main shaft 42 is fixed a cam 48 having one end 49 of a coil spring 50 anchored in a hole therein. This spring surrounds the sleeve 46 and is formed of square section steel wire, its opposite end being anchored in a hole in a further cam 19 which is rotatable upon the sleeve 46. The free internal diameter of the spring 50 is slightly less than the external diameter of the sleeve 46 which is arranged to be rotated by the worm shaft 44 in such a direction that it tends to wrap the spring 50 on to it and hence, in effect, engage a clutch between it and the cam 48 on the main shaft 42.

An arm 52 is connected to the armature 16 of the solenoid 15, the armature being pivoted at 17 and being biased by a spring 18 in a direction such as to urge the arm 52 towards the cam 19 where its end engages a step in the cam 19 and locks this cam against rotation. The effect of this is to tend to unwind the spring 50 and thus allow the sleeve 46 to rotate without driving the main shaft 42. The unwinding of the spring also applies a torque to the cam 19 holding it against the arm 52.

When the solenoid 15 is energised, the arm 52 disengages from the cam 19 thus permitting the spring 50 to wind up on the sleeve 46 and thus engage the clutch between the sleeve 46 and the main shaft 42. The cam 36 is thus rotated and the film on the sprocket 28 is advanced by one frame.

The energization of the solenoid 15 by the discharge of the capacitor 12 of Fig. 1 is brief and when it ends the arm 52 is released and is in condition to arrest the rotation of the cam 19 after one rotation of the cam. The mechanism described is, however, such that when the energisation of the solenoid 15 ceases the clutch remains engaged until the cam 19 is stopped by the arm 52. When the cam 19 is thus stopped, the inertia of the main shaft 42 and the parts rotating therewith cause it to overshoot and unwind the spring 50 until it is free on the sleeve 46. The cam 48 to which is fixed the rear end of the spring 50 has a step which is adapted to be engaged by a spring loaded pawl 53 during the overshoot and this prevents the spring 50 from tightening around the sleeve 46 upon rebound after the overshoot. The pawl 53 is so mounted upon the frame that it can be adjusted around the axes of the main shaft 42. It can therefore be so set that is just catches the cam 48 at the limit of its overshoot. When the clutch is engaged, the direction of rotation of the cam 48 is the opposite to that on the rebound after the overshoot and the pawl, therefore, passes over the stop.

The motor driving the worm shaft 44 is one having ample power and inertia so that its speed does not vary appreciably when it is coupled to the sprocket 28.

We claim:
1. Photographic film-advancing means comprising a driving motor adapted to be rotated continuously, a rotatable driving member, a clutch coupled between said motor and said driving member, a rotatably mounted sprocket for engaging in perforations in the film, a mechanism coupled between said sprocket and said driving member and determining the extent of the angular rotational movement of said sprocket for each complete rotation of said driving member, and means for intermittently engaging said friction clutch, said friction clutch comprising a sleeve continuously driven by said motor, a coil spring surrounding said sleeve, one end of said spring being fixed to said driving member, a cam member rotatable relatively to and coaxial with said sleeve and having the other end of said spring fixed thereto and detent means engaging said cam member and normally preventing rotation thereof, thereby maintaining said clutch disengaged, and said means for engaging the clutch comprising a solenoid positioned to withdraw said detent means from said cam member and thereby permit said spring to coil up on said sleeve.

2. Photographic film-advancing means according to claim 1, comprising a capacitor, a current source, and a two-position switch means connecting said capacitor to said source in one position and connecting said capacitor to said solenoid in the other position.

3. Photographic film-advancing means according to claim 1 comprising a further cam member fixed to said driving member and a ratchet engaging and preventing rotation of said further cam member in a direction opposite to that of said sleeve.

4. Photographic film-advancing means comprising a driving motor adapted to be rotated continuously, a rotatable driving member, a clutch coupled between said motor and said driving member, a rotatably mounted sprocket for engaging in perforations in the film, a rotatable driving member, a mechanism coupled between said sprocket and said driving member and determining the extent of the angular rotational movement of said sprocket for each complete rotation of said driving member, electromagnetic means for engaging said clutch, a capacitor, a source of electrical energy, and switch means operable to connect said capacitor alternately to said source to receive a charge and to said electromagnetic means to discharge through and thereby actuate said electromagnetic means, said clutch comprising a sleeve continuously driven by said motor, a coil spring surrounding said sleeve, one end of said spring being fixed to said driving member, a cam member rotatable relatively to and coaxial with said sleeve and having the other end of said spring fixed thereto, and detent means engaging said cam member and normally preventing rotation thereof, thereby maintaining said clutch disengaged, and said electromagnetic means withdrawing said detent means from said cam member and permitting said spring to coil up on said sleeve and thereby lock said sleeve to said cam member during one revolution of said cam member.

References Cited in the file of this patent

UNITED STATES PATENTS

| | | |
|---|---|---|
| 929,743 | Wooden | Aug. 3, 1909 |
| 1,228,255 | Spiro | May 29, 1917 |
| 2,034,543 | Twiss et al. | Mar. 17, 1936 |
| 2,622,957 | Wise | Dec. 23, 1952 |
| 2,751,815 | Larson | June 26, 1956 |
| 2,782,701 | Helber | Feb. 26, 1957 |

FOREIGN PATENTS

| | | |
|---|---|---|
| 211,419 | Great Britain | Feb. 21, 1924 |